May 11, 1937. R. ELSSNER ET AL Re. 20,356
METHOD OF EQUALIZING THE DYEING QUALITIES OF ARTIFICIAL FILAMENTS
Original Filed Feb. 13, 1933 4 Sheets-Sheet 1
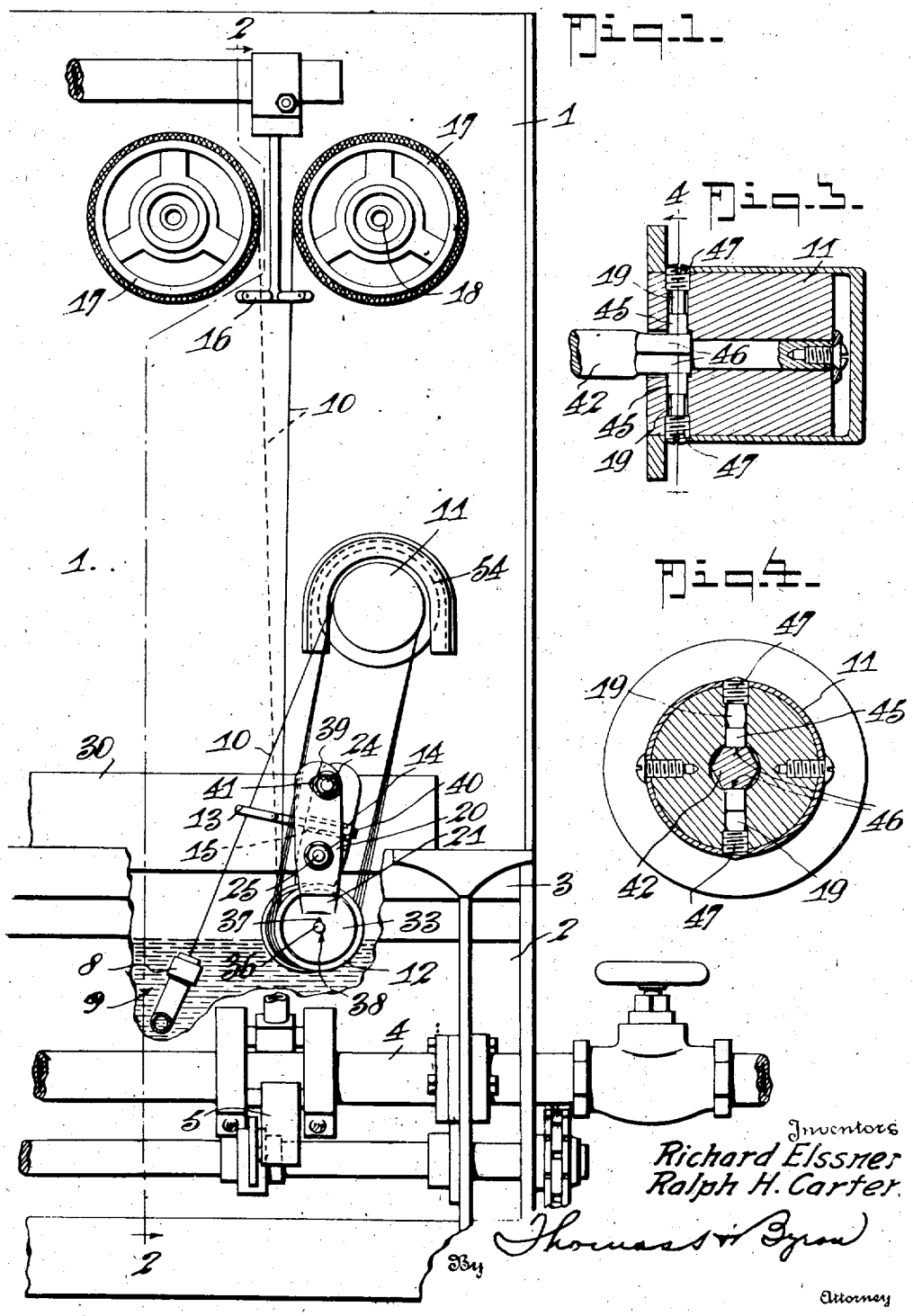

May 11, 1937. R. ELSSNER ET AL Re. 20,356
METHOD OF EQUALIZING THE DYEING QUALITIES OF ARTIFICIAL FILAMENTS
Original Filed Feb. 13, 1933 4 Sheets-Sheet 2
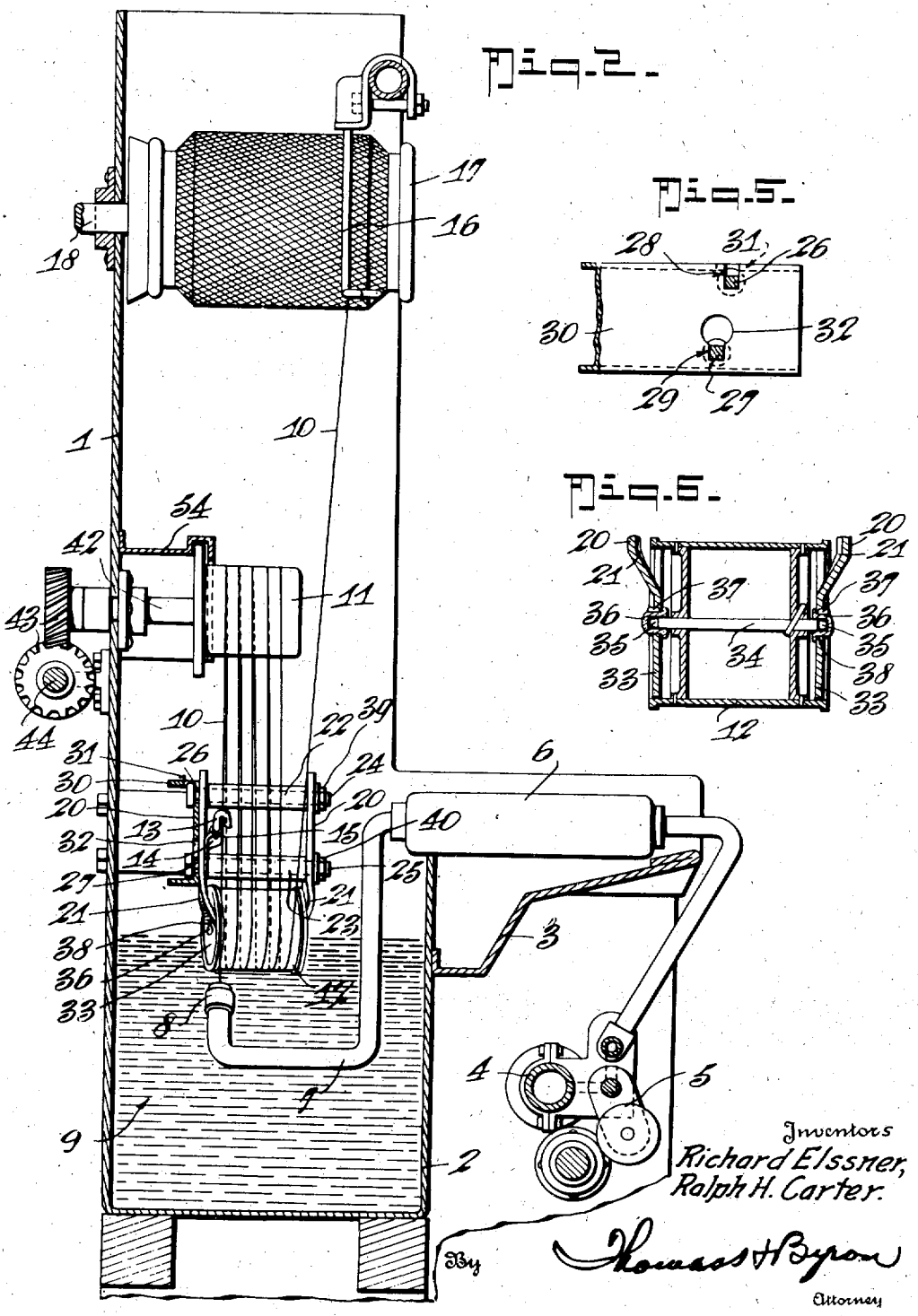

METHOD OF EQUALIZING THE DYEING QUALITIES OF ARTIFICIAL FILAMENTS

Original Filed Feb. 13, 1933 4 Sheets-Sheet 3

Inventors
Richard Elssner,
Ralph H. Carter.
By Thomas H. Byron
Attorney

METHOD OF EQUALIZING THE DYEING QUALITIES OF ARTIFICIAL FILAMENTS

Original Filed Feb. 13, 1933 4 Sheets-Sheet 4

Inventors
Richard Elssner,
Ralph H. Carter.
By Thomas H. Rogers
Attorney

Reissued May 11, 1937 Re. 20,356

UNITED STATES PATENT OFFICE 20,356

METHOD OF EQUALIZING THE DYEING QUALITIES OF ARTIFICIAL FILAMENTS

Richard Elssner, Elizabethton, and Ralph H. Carter, Johnson City, Tenn., assignors to North American Rayon Corporation, New York, N. Y., a corporation of Delaware Original No. 1,992,897, dated February 26, 1935, Serial No. 656,538, February 13, 1933. Application for reissue May 4, 1936, Serial No. 77,882

11 Claims. (Cl. 18—8)

This invention relates to angle axis spinning rollers for spinning machines in the manufacture of yarns of artificial origin, but primarily has for its object the increase of the coagulating length of the yarn between spinnerette and take-up roller or spool for the purpose of improving the quality of the yarn.

Another object of our present invention is an improved roller means over which the green or freshly-extruded yarn passes before reaching the thread guide and spool thereby increasing the coagulating length and eliminating unevenness of dyeing and the resultant so-called flame effect.

Still another object of our present invention lies in providing an improved roller means over which the green yarn passes, which roller means is easily and quickly adjustable with respect to the adjusting of the spacing angle which determines the spacing and coagulating length of the yarn.

Further, another object of our invention is in the use of the improved roller means, power being applied to one of the rollers to drive it at a constant speed with relation to the take-up spool for the purpose of creating a gradual increase in tension as the yarn body builds up on the take-up spool or roller, which increase in tension tends to eliminate the inside-outside dyeing difference.

Another object of the present invention lies in providing an improved roller means over which the green yarn passes, one of said rollers being power-driven thereby enabling regulation in the tightness with which the yarn body is wound.

These and other objects of our present invention will in part be pointed out and in part become obvious from a study of the following description and by reference to the drawings attached, in which:

Figure 1 is a front elevation of a portion of a spinning machine with the preferred form of our invention applied;

Figure 2 is a vertical cross section taken on the line 2—2 of Figure 1 looking in the direction of the arrows;

Figure 3 is an enlarged detail vertical section of the power driven roller as used in the preferred form of our invention;

Figure 4 is an enlarged detail vertical cross-section taken on the line 4—4 of Figure 3;

Figure 5 is a detail section of the manner of attaching the bracket assembly of the filament driven roller used in the preferred form of our invention;

Figure 6 is an enlarged detail vertical section of the filament driven roller and bearing means as used in our preferred form;

Figure 7:
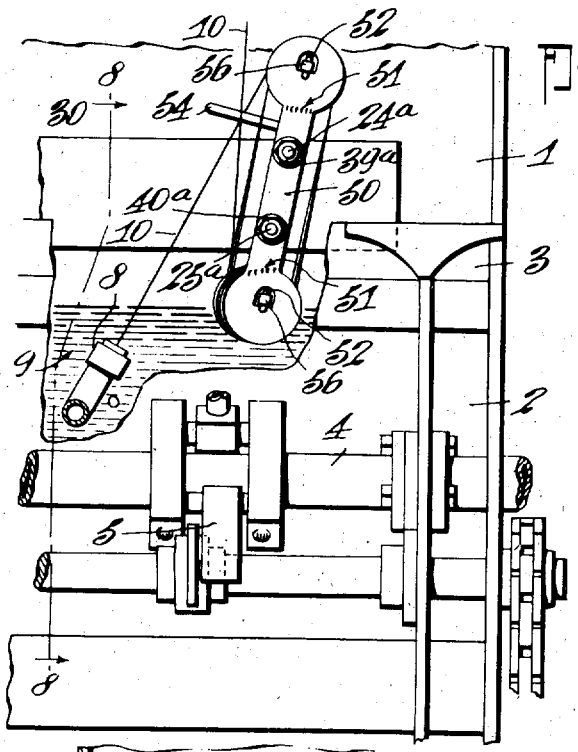
Figure 7 is a detail front elevation of a modified form of our invention on a spinning machine.

In the manufacture of rayon by the spool spinning process, numerous disadvantages arise during spinning, owing to the comparatively short coagulating distance between spinnerette and spool, and it has been found that upon increasing the coagulating length by placing rollers (grooved or otherwise) between the spinnerette and take-up spool for the yarn to pass over, unevenness in dyeing or flame effect of green yarn, which is one of the main disadvantages of spool spinning, is practically eliminated. By the application of such rollers the physical characteristics of the yarn thus spun may also be changed to a certain extent according to the application used.

It has also been found that by power driving one of the intermediate rollers at a constant speed with relation to the speed of the take-up spool that a slight tension is imparted towards the end of the spinning due to the fact that the yarn in building up enlarges in diameter, thereby increasing the peripheral speed and exerting a slight increase of tension which eliminates to a great extent the inside-outside dyeing effect.

Referring now to the drawings in which like numerals indicate like parts and more particularly to Figures 1 to 6, in which we have shown the preferred embodiment of our invention, 1 indicates the back board of a spinning machine, 2 the trough portion for holding the coagulating bath, and 3 a splash drain.

The spinning solution is passed through a pipe 4 to a pump 5 and forced through the candle filter 6 and thence through the goose neck 7 and finally extruded through the spinnerette 8 and passes through the coagulating bath 9 which is contained in the trough 2.

The filaments 10, after passing through the bath 9, are carried over a power driven roller 11, which may be grooved or be perfectly smooth as shown. After passing around the roller 11, the filaments 10 are brought down and around the freely rotatable angle axis roller 12. The number of times the filaments are passed around the rollers 11 and 12 is optional.

A thread guide 13 is rigidly attached to a clip 14 by a key and slot arrangement 15. The clip 14 is securely fastened to one of the bracket arms 2 of which more will be said later. This thread guide 13 receives the filaments 10 as they are extruded from the spinnerette 8 and guides them on their first passing around the roller 11.

The filament 10, after leaving the angle axis roller 12 on its last loop, is brought upwardly and passed through the oscillating thread guide 16, thence over the take-up spool 17, which is power driven (means not shown), and revolves on the shaft 18.

The spacing of the filament loops is determined by the angle of the axis 34 of the angle axis roller 12. This angle is adjustable as will later be described.

The assembly of the angle axis roller 12 comprises two side bracket members 20—20 twisted to a desired angle at 21—21. These bracket members 20—20 are held in spaced relation by spacer sleeves 22 and 23 and bolts 24 and 25 respectively. Squared portions 26 and 27 are fashioned adjacent the heads of bolts 24 and 25 for the purpose of fitting in the squared lower end of slots 28 and 29 respectively on the U channel 30 which acts as a support for the bracket assembly of the angle axis roller 12. The slots 28 and 29 in the U angle 30 have enlarged openings 31 and 32 respectively for the purpose of inserting the heads of the bolts 24 and 25. After the insertion of bolts 24 and 25, they are forced down into the squared lower ends of slots 28 and 29, the squared bolt portions 26 and 27 then fitting in such a fashion as to prevent the rotation of the bolts 24 and 25 in said slots for a reason later to be more fully described.

The lower ends 33—33 of the side bracket members 16—16 are circular in shape and fit within the angle axis roller 12 as clearly shown in Figures 5 and 6 of the drawings. The purpose of this arrangement is to prevent the filaments 10 reaching the bearings of the angle axis roller 12 and wrapping and twisting around said bearing in the event of the filaments slipping off. The angle axis roller 12 is provided with a shaft 34 having pointed ends 35 which rotate in glass or porcelain bearings 36, said bearings 36 being provided with keys 37 which fit into the bearing slots 38—38.

In order to adjust the angle of the roller 12 for the desired spacing of the filament loops as they pass over the rollers 11 and 12 the nuts 39 and 40 of the bolts 24 and 25 respectively are loosened, allowing the side bracket members 20—20 to pivot on the bolt 25 within the confines of the arcuate slots 41—41 through which the bolt 24 extends. When the desired angle is obtained it is then only necessary to tighten up on the nuts 39 and 40. Thus it can be seen that the spacing of the filament loops 10 may be such that either a lesser or greater number of loops than the number shown on the drawings may be used.

The power driven roller 12 rotates with a shaft 42 driven by a pair of spiral gears 43 one of which is turned by the power shaft 44, which shaft may be driven by any suitable means (not shown).

The roller 11 is clutch held on the shaft by means of plugs 45 pressed against the flat places 46 of the shaft 42. The pressure on plugs 45 can be exerted in any suitable manner, or as shown in the drawings, by expansible rubber inserts 19 held in place by tap screws 47. This is done so that, if the operator for any reason desires to stop the roller 11, he can do so by grasping it firmly, as only sufficient force is exerted by the clutch element to draw the filaments. Such a means eliminates the necessity of stopping the machine while redoffing in case of a broken filament, or cleaning the roller 11.

A shield 54 is placed over and around the back flange of the power driven roller 11 to prevent any drippings from the yarn reaching the shaft 42 and crystallizing whereby interference with its operation might result also to prevent the yarn twisting around said shaft 42 should a break occur.

In the drawings the roller 12 is shown partially immersed in the coagulating bath 9. This is preferable but not absolutely essential to the results desired.

In operation, the angle axis roller 12 is adjusted as described in the foregoing part of the specification, to the angle desired for the number of loops required. The extruded filaments from the spinnerette 8 are then passed through the rigid thread guide 13 up and around the power driven roller 11, down and around the filament driven roller 12 and with repeated loopings as many times as required, then finally up to the oscillating thread guide 16 and onto the take-up spool 17.

At the beginning of the winding the peripheral speeds of the take-up spool 17 and the power driven roller 11 are equal, or nearly so, but as the filaments build up on the spool, the peripheral speed of the take-up spool 17 becomes increasingly greater and the tension on the filaments is correspondingly increased. The result is that the greatest tension is on the outside of the yarn and this tends to eliminate the inside-outside dyeing difference. The flame effect which is caused by any number of factors such as uneven coagulation, is compensated for by the increase in spinning length.

Figure 9:
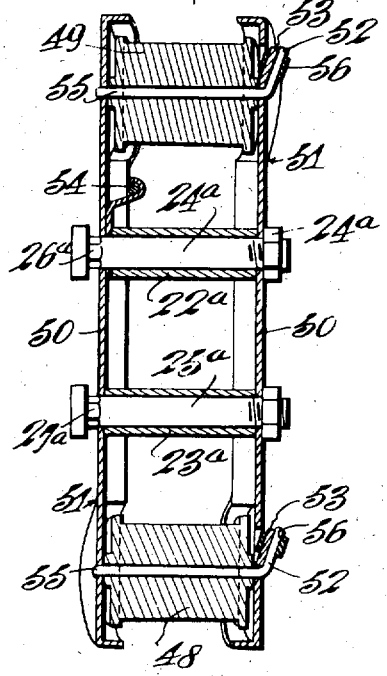
Figure 9 is an enlarged vertical section taken through the bracket and roller assembly shown in our modified form.
Figure 8:
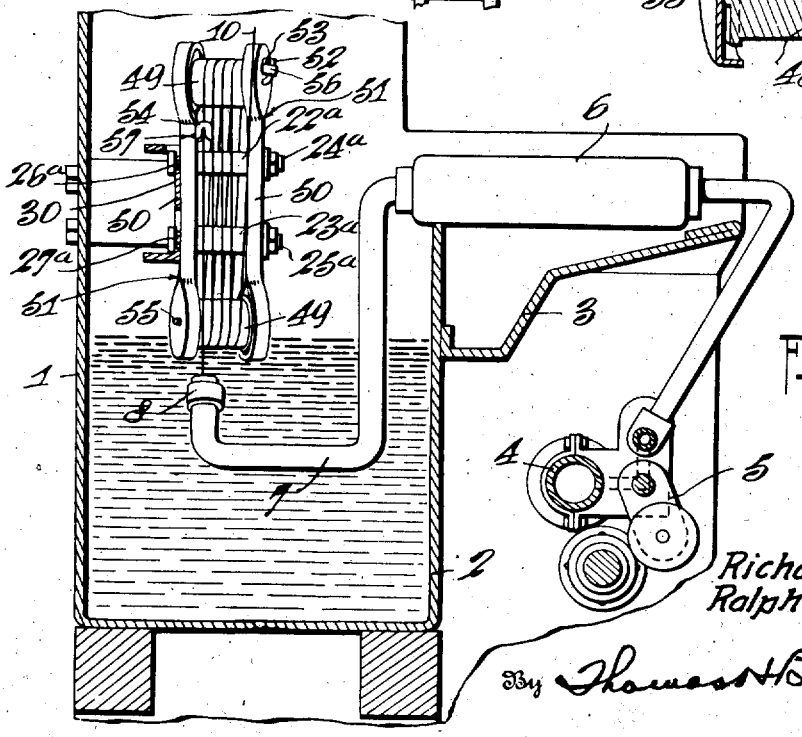
Figure 8 is a vertical section of the parts shown in Figure 7.

In Figures 7–9 is shown a modification of our invention. In this form both rollers are filament driven. The device comprises spaced rollers 48—49 supported by side bracket members 50—50 twisted at 51—51 and held in spaced relation by bolts 24*a* and 25*a* and spacer sleeves 22*a* and 23*a*. This bracket assembly is supported in the same fashion as in my preferred form, like parts being numbered similarly, but with the letter *a* added thereto.

The rollers 48—49 rotate on shafts 55—55, said shafts 55—55 having at one end extended bent portions 52—52 which coincide with projecting lugs 53—53 adjacent the bearing apertures of the side brackets 50—50. A holding means which may consist of an elastic element 56 is then forced over the lug 53 and bent portion 52 of the shaft 55. This arrangement is such that there is neither endwise nor rotative movement of the shaft 55 and makes an inexpensive and easily replaceable fastening means.

A rigid thread guide 54 is secured on the inside bracket member 50 by holding means, a key and slot arrangement 57 holding said thread guide 54 from axial rotation. This thread guide performs the same function as the thread guide 13 in our preferred form.

Figure 10:
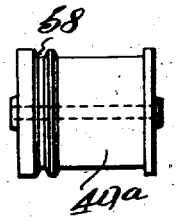
Figure 10 is a side elevation of a modified form of a roller that may be used with our invention.

A modified form of roller as illustrated in Figure 10 of the drawings may be used. This roller 49a, which may be used in place of roller 49 shown in the second form of the invention, has a groove 58 for the purpose of positioning the first pass of the filaments 10 as they are extruded from the spinnerette 8. With this type of roller 49a the thread guide 54 can be dispensed with or used in an alternative form.

Figure 11:
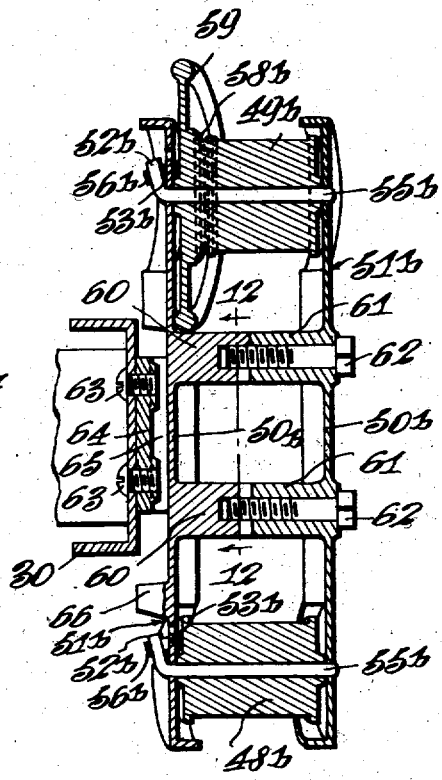
Figure 11 is a vertical cross-sectional view of a modified form of the bracket assembly with another modified form of roller being used.
Figure 12:
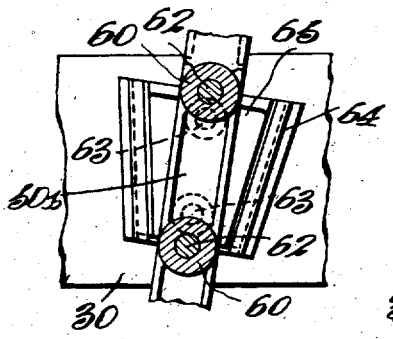
Figure 12 is a detail cross-section on the line 12—12 of Figure 11.
Figure 13:
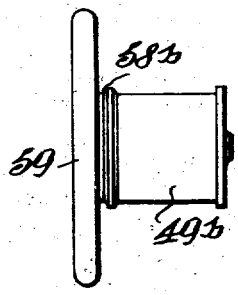
Figure 13 is a side elevation of the roller used in the form illustrated in Figure 11.

In Figures 11–13 is shown a modified form of the bracket assembly with another type of roller being used. The reference numerals used will be the same as for corresponding parts shown in Figures 7 to 9 except that the letter *b* will be used with the numerals.

The bracket assembly in this form comprises spaced rollers 48b—49b supported by side bracket members 50b—50b twisted at 51b—51b and held in spaced relation by lugs 60—61. The lugs 60 have threaded sockets for receiving the bolts 62 which are inserted through the bored lugs 61.

In this form the bracket assembly is supported through a dove-tail means. One portion of the dove-tail is screwed to the U-angle 30 by screws 63 and is indicated by the numeral 64. The other part of the dove-tail indicated as 65 is integral with the inner bracket member 50b.

The rollers 48b—49b rotate on the shafts 55b—55b which are the same as the shafts illustrated in Figures 7–9 and which are secured in the same fashion by the elastic means 56b.

The modified roller 49b used in this form and shown per se in Figure 13 of the drawings is designed to function as a fly wheel for stabilizing any tendencies of lag which might possibly occur thereby causing possible unevenness in denier. In this form the roller 49b also has a positioning groove 58b which is illustrated in Figure 10. Adjacent the groove 58b is a disc shaped flange 59 having an enlarged periphery similar to the usual fly wheel. This fly wheel roller 49b may also be considered the equivalent of roller 49 as illustrated in our second modified form.

A lug 66 has been placed just above the fastening means on the lower roller. The purpose of this lug 66 is to protect the turned up end 52b of the shaft 55b from being broken off when lifting the bracket assembly from the spinning machine.

Having now set forth our invention as required by the patent statutes, it is believed that it will be easily understood by anyone skilled in the art, and what we claim is:

1. In a process for equalizing the dyeing qualities of artificial filaments, the steps of extruding the filaments under the surface of a bath and passing them upwardly to a freely rotatable surface, then downwardly to another freely rotatable surface, at least one of said surfaces being out of said bath, repeating the upward and downward passage a plurality of times over the said surfaces, and then passing the filaments upwardly to a collecting device under increasing tension.

2. In a process for equalizing the dyeing qualities of artificial filaments, the steps of extruding the filaments under the surface of a bath and passing them upwardly to a freely rotatable surface, then downwardly to another freely rotatable surface, said second freely rotatable surface being immersed in a bath calculated to aid in the precipitation of the filaments, repeating the upward and downward passage of the filaments a plurality of times over the said surfaces, and then passing the filaments upwardly to a collecting device under increasing tension.

3. In an apparatus for equalizing the dyeing qualities of artificial filaments, in combination, a spinnerette for extruding the filaments, a take-up roller or spool and thread guide associated therewith, freely rotatable rollers over which the filaments are looped a plurality of times before passing to the guiding and take-up device, one of said rollers having a circular flange integrally attached thereto, said flange being weighted at its outer periphery, whereby lagging tendencies of said roller are overcome, and means for rotating said take-up means at a predetermined progressively increasing peripheral speed.

4. In a process for equalizing the dyeing qualities of artificial filaments, the steps of extruding the filaments under the surface of a bath and passing them upwardly to a rotating surface, then downwardly to a rotatable surface, at least one of said surfaces being out of said bath, repeating the upward and downward passage a plurality of times over the said surfaces and then passing the filaments upwardly to a collecting device under an increasing tension.

5. In a process for equalizing the dyeing qualities of artificial filaments, the steps of extruding the filaments under the surface of a bath and passing them upwardly to a rotating surface, then downwardly to a rotatable surface, repeating the upward and downward passage a plurality of times over the said surfaces and then passing the filaments upwardly to a collecting device under an increasing tension, the lowermost of the said surfaces contacting with the bath.

6. In an apparatus for equalizing the dyeing qualities of artificial filaments, in combination, a spinnerette for extruding the filaments, a take-up roller or spool and thread guide associated therewith, a pair of rollers over which the filaments are looped a plurality of times, said rollers being positioned between said spinnerette and said take-up device, one of said rollers being power-driven and the other of said rollers being freely rotatable and means for rotating said take-up means at a predetermined progressively increasing peripheral speed.

7. In an apparatus for equalizing the dyeing qualities of artificial filaments, in combination, a spinnerette for extruding the filaments, a take-up roller or spool and thread guide associated therewith, a pair of rollers over which the filaments are looped a plurality of times, said rollers being positioned between said spinnerette and said take-up device, one of said rollers being power driven at a constant speed and the other of said rollers being freely rotatable, and means for rotating said take-up means at a predetermined progressively increasing peripheral speed.

8. In a process for producing artificial yarn, the steps of extruding the yarn, passing it through a coagulating or precipitating bath, and thence, a plurality of times, over a series of rollers, to a take-up device, one of said rollers being power driven, said power driven roller controlling the speed at which the said yarn passes thereover, so that, as the collecting device increases its body of yarn a higher peripheral speed will be exerted, whereby the yarn will be wound under an increasingly greater tension as the build-up increases.

9. A process for producing artificial threads which comprises extruding a cellulosic solution to form a thread, passing the thread through a precipitating bath to coagulate the same, conducting the thus treated thread over a series of rollers one of which is positively driven to draw the thread from the bath and propel the same, collecting the thread, and subjecting the succeeding portions of said thread to a gradually increasing tension during its passage from the driven roller to the point of collection to thereby increase the stretch of the last wound layers as the package is formed.

10. A process for producing artificial threads which comprises extruding a cellulosic solution to form a thread, passing the thread through a precipitating bath to coagulate the same, drawing the thread from the bath by a driven roller, conducting the thus treated thread over additional rollers and forming a package having improved dyeing properties by collecting succeeding layers of thread under a gradually increasing tension whereby the last wound layers are stretched to a greater extent than the first wound layers.

11. A process for producing artificial threads which comprises extruding a cellulosic solution to form a thread, passing the thread through a precipitating bath to coagulate the same, drawing the thread from the precipitating bath by a driven roller, leading the thread around at least one freely rotatable roller and thence to a collecting device and during passage of the thread from the driven roller to the collecting device progressively increasing the tension on succeeding portions of the thread whereby a package is formed in which the last wound layers have been subjected to a greater tension than the first wound layers.

RICHARD ELSSNER.
RALPH H. CARTER.